US010922069B2

United States Patent
Grill et al.

(10) Patent No.: US 10,922,069 B2
(45) Date of Patent: Feb. 16, 2021

(54) FLEXIBLE, MULTIDIMENSIONAL INFRASTRUCTURE SCALING

(71) Applicant: Aptiv Technologies Limited, St. Michael (BB)

(72) Inventors: Daniel Grill, Santa Clara, CA (US); Tao Lin, Palo Alto, CA (US); Mahbubul Alam, Mountain View, CA (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/571,071

(22) Filed: Sep. 14, 2019

(65) Prior Publication Data

US 2020/0104113 A1 Apr. 2, 2020

Related U.S. Application Data

(60) Provisional application No. 62/737,831, filed on Sep. 27, 2018.

(51) Int. Cl.
*G06F 8/65* (2018.01)
*G06Q 30/02* (2012.01)
(Continued)

(52) U.S. Cl.
CPC ............ *G06F 8/65* (2013.01); *G06Q 30/0283* (2013.01); *H04W 4/50* (2018.02);
(Continued)

(58) Field of Classification Search
CPC .......... G06F 8/65; G06F 9/5061; H04W 4/50; H04W 72/1289; H04W 24/02;
(Continued)

(56) References Cited

U.S. PATENT DOCUMENTS

| 2014/0199962 A1* | 7/2014 | Mohammed et al. | H04W 4/50 455/406 |
| 2014/0282470 A1* | 9/2014 | Buga et al. | G06F 8/65 717/170 |

(Continued)

*Primary Examiner* — Wei Y Zhen
*Assistant Examiner* — Mohammed N Huda
(74) *Attorney, Agent, or Firm* — Colby Nipper PLLC (57) ABSTRACT

Flexible, multidimensional infrastructure scaling for cloud-based over-the-air (OTA) systems is disclosed. The method comprises: obtaining requirements for OTA updates; obtaining infrastructure scaling data indicative of at least one of information technology (IT) infrastructure or communications resources provided by at least one mobile network operator (MNO); determining, using the infrastructure scaling data, a plurality of infrastructure scaling options that satisfies the requirements; determining a cost associated with each of the infrastructure scaling options; determining a cost-optimal infrastructure option from the plurality of infrastructure scaling options that satisfies the requirements for OTA updates and has the lowest associated cost; procuring and allocating a number or type of infrastructure components according to the cost-optimal infrastructure option; communicating an update time and update channel for delivering the OTA updates to the mobility clients; and initiating delivery of the OTA updates to the mobility clients using the procured and allocated infrastructure components.

20 Claims, 3 Drawing Sheets

(51) Int. Cl.
  *H04W 72/12* (2009.01)
  *H04W 4/50* (2018.01)
  H04W 24/02 (2009.01)
  H04L 12/911 (2013.01)
  H04L 12/915 (2013.01)
  H04W 48/18 (2009.01)

(52) U.S. Cl.
  CPC ....... *H04W 72/1289* (2013.01); *H04L 47/783* (2013.01); *H04L 47/787* (2013.01); *H04W 24/02* (2013.01); *H04W 48/18* (2013.01)

(58) Field of Classification Search
  CPC ....... H04W 48/18; G06N 5/02; G05D 1/0088; B60L 3/0061; B60L 3/12; B60L 15/20; B60L 58/10; G06Q 40/08; G06Q 30/0238; G06Q 30/0283; B60W 2050/0071; B60W 2050/0215; B60W 50/045; H04L 67/18; H04L 67/34; H04L 41/082; H04L 47/783; H04L 47/787
  USPC ........................................................ 717/172
  See application file for complete search history.

(56)  References Cited

U.S. PATENT DOCUMENTS

2015/0126110 A1* 5/2015 Ashley et al. .......... H04W 4/50
                                                       455/41.1
  2017/0139701 A1   5/2017 Lin et al.
  2017/0214727 A1*  7/2017 Hebbar ................... H04L 67/34

* cited by examiner

FLEXIBLE, MULTIDIMENSIONAL INFRASTRUCTURE SCALING

CROSS-REFERENCE TO RELATED APPLICATION

This application claims the benefit under 35 U.S.C. § 119(e) of U.S. Provisional Patent Application No. 62/737,831, filed Sep. 27, 2018, the entire disclosure of which is hereby incorporated herein by reference.

TECHNICAL FIELD

This disclosure relates generally to over-the-air (OTA) systems and update services.

BACKGROUND

Automotive original equipment manufacturers (OEMs) produce about 70 million new automobiles each year worldwide. In the future, most modern vehicles will be "connected" vehicles meaning the vehicles will wirelessly connect to automotive OTA systems to receive software updates. Modern vehicles can include as many as 70 electronic control units (ECUs). Given that scale, millions of devices inside vehicles will require software update services from automotive OTA systems.

To meet this demand, automotive OTA systems have to support small to large scale software update campaigns in a cost-effective manner. For this reason, automotive OTA services are built on cloud technologies that support horizontal and vertical scaling mechanisms for central processing units (CPUs), memory and storage. Communications bandwidth is typically a non-issue for scaling with automotive OTA systems, since state-of-the-art data centers are connected by fast fiber optic backbones. However, for OTA software updates over cellular wireless media the costs are determined by wireless link speed to a vehicle, which typically has a different cost-structure that is dependent on geolocation, carrier and time of day.

Most of the wireless links are based on cellular technologies, such as 3G, 4G-LTE and 5G. The scalability of cellular networks and the limitations in access capacity in each cell provide certain restrictions. For example, the cost of cellular connectivity often depends on the size of the update. The cost may also depend on the type of vehicle, the number of ECUs, the frequency of updates and the number of vehicles. Accordingly, the cost of each update campaign can become a significant burden for automotive OEMs.

Remote software update capability is implemented as an integral component of a modern personal computer operating system (OS) and related application ecosystem (e.g., Apple® OS, Android® OS). Typically, computer OS companies provide features, quality improvements and security updates to mobile devices (e.g., smart phones, tablet computers) that are made available for download, and are automatically installed by an update manager that runs on the mobile device. Further, application developers provide updates to their "apps" on online "app" stores. When an update is available for download, the end-user of the mobile device is made aware of the update and prompted to accept and initiate an update process on their mobile device. After successful download, the update is installed. In the case of a failed update, a manual process (e.g., supported by help desk information) is often used to recover from the failure.

In business environments, update processes are often customized and managed by information technology (IT) administrators rather than end-users. Scheduling an update is typically triggered by the end-user of the device. To manage load peaks, download speeds may be "throttled," or for large deployments, the availability of the updates may be staggered over a period of time for different kinds of mobile devices.

For automotive OTA updates a similar approach can be taken as for computer OS ecosystems in regards to technical building blocks and processes. However, because of the potential impact of the update to passenger safety and vehicle function, there are higher requirements for security and robustness in automotive applications than mobile devices. For example, OTA systems for computer OS ecosystems are often not aware of underlying access technologies or the core infrastructure of the cellular network operator, and therefore act independently of the cellular network provider. Because of this independence, existing OTA systems for computer OS ecosystems do not account for peak load hours, the most expensive times of a day or access network capacity limitations at certain geographical locations.

SUMMARY

The disclosed embodiments are directed to flexible, multidimensional infrastructure scaling for cloud-based OTA systems. In an embodiment, a method comprises: obtaining, by one or more server computers of a network-based, over-the-air (OTA) computing platform, one or more requirements for OTA updates; obtaining, by the one or more server computers, infrastructure scaling data indicative of at least one of information technology (IT) infrastructure or communications resources provided by at least one mobile network operator (MNO); determining, by the one or more server computers and using the infrastructure scaling data, a plurality of infrastructure scaling options that satisfies the one or more requirements; determining, by the one or more server computers, a cost associated with each of the infrastructure scaling options; determining, by the one or more server computers, a cost-optimal infrastructure option from the plurality of infrastructure scaling options that satisfies the one or more requirements for OTA updates and has the lowest associated cost; procuring and allocating, by the one or more server computers, a number or type of infrastructure components according to the cost-optimal infrastructure option; communicating, by the one or more server computers to the mobility clients, an update time and update channel for delivering the OTA updates to the mobility clients; and initiating, by the one or more server computers, delivery of the OTA updates to the mobility clients using the procured and allocated infrastructure components.

One or more embodiments of the disclosed system provide one or more of the following advantages: 1) more reliable and efficient updates to mobility clients; 2) increased cost savings; 3) more even network capacity utilization (allows mobile network operators to provide better services to other users in a shared environment); 4) saves valuable and expensive licensed, unlicensed and free wireless spectrum for other needs; 5) avoids network congestion; 6) avoids building overcapacity of networks; 7) provides mobility client component updates when safe; and 8) saves costs of cloud infrastructure by optimizing load even when the mobility client uses different types of access (e.g., WiFi).

The details of the disclosed implementations are set forth in the accompanying drawings and the description below.

Other features, objects, and advantages are apparent from the description, drawings, and claims.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements are not shown in the drawings so as not to obscure the disclosure. In addition, for ease of illustration, a single connecting element is used to represent multiple connections, relationships or associations between elements. For example, where a connecting element represents a communication of signals, data or instructions, it should be understood by those skilled in the art that such element represents one or multiple signal paths (e.g., a bus), as may be needed, to affect the communication.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first processor could be termed a second processor, and, similarly, a second processor could be termed a first processor, without departing from the scope of the various described embodiments. The first processor and the second processor are both processors, but they are not the same processor.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Example OTA Operating Environment

Figure 1:
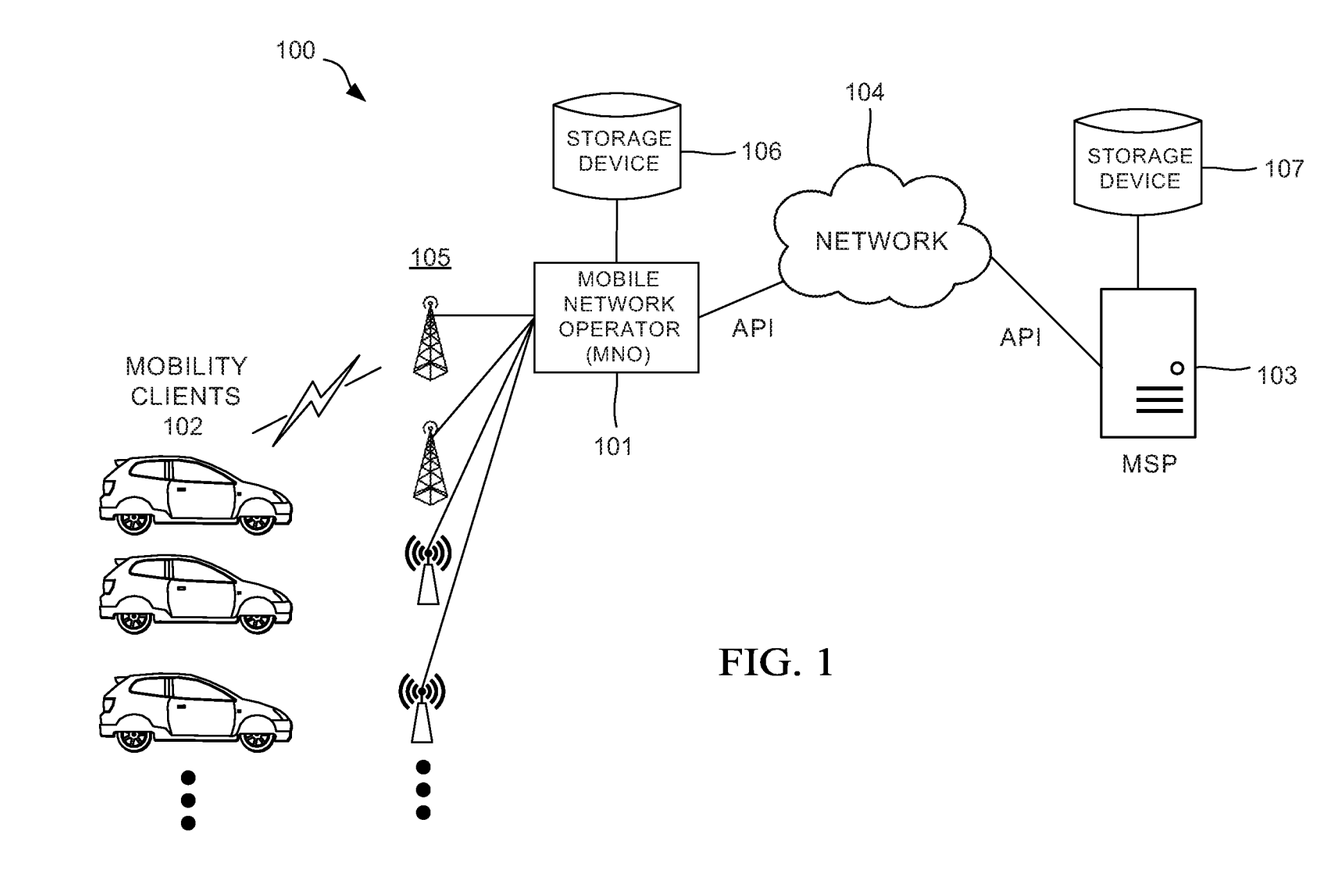
FIG. 1 is a block diagram of an OTA system that provides flexible, multi-dimensional infrastructure scaling, according to an embodiment.

FIG. 1 is a block diagram of OTA operating environment 100 that provides flexible, multi-dimensional infrastructure scaling, according to an embodiment. Operating environment 100 includes mobile network operator (MNO) 101, mobility clients 102, mobility services platform (MSP) 103 and network 104 (e.g., the Internet). Although a single MNO 101 is shown, operating environment 100 can include any number of MNOs.

As used herein, the term "MNO" means any wireless service provider, wireless carrier, cellular company or mobile network carrier (e.g., Verizon®, AT&T®).

As used herein, the term "mobility client" means any non-autonomous, autonomous or semi-autonomous vehicle, or any device or component, such as IoT devices/components and electronic control units (ECUs), that is capable of receiving an OTA update.

As used herein, the term "vehicle" means any machine or apparatus that transports goods or people. For example, cars, buses, trains, airplanes, drones, trucks, boats, ships, submersibles, dirigibles, mobile robots, etc.

As used herein, "OTA update" is any over-the-air update, change, deletion or addition to software, firmware, data or configuration settings, or any combination thereof that is delivered to mobility clients using proprietary or standardized wireless communications technology, including but not limited to: cellular communications (e.g., 3G, 4G, 5G), wireless local area network communications (e.g., WiFi) and satellite communications. The software/firmware to be updated can have several properties, including but not limited to: the data compression method, the size of the update, the urgency of the update (e.g., set by an OEM), the security level of the update, the geographic region where the update is to be deployed and the estimated cost of the update.

Additionally, for each update MSP 103 considers the number of engines (e.g., number of message engines) to be instantiated, the number of human agents needed to administer the campaign and other software/firmware update tasks.

As used herein, "vertical infrastructure scaling" means to add resources to (or remove resources from) a single node in an OTA system, typically involving the addition of central processing units (CPU) or memory to a single OTA server. Vertical scaling of existing systems also enables OTA systems to use virtualization technology more effectively, as it provides more resources for a hosted set of operating system and application modules to share.

As used herein, "horizontal infrastructure scaling" means to add more distribution nodes to (or remove distribution nodes from) an OTA system, such as adding a new OTA server for an OTA update. A distribution node can be an instance of an OTA server connected to one or more MNOs in a specific geographic region, such as the Western United States. Thus, the number of OTA servers/instances run in datacenters in specific geographic regions can be horizontally scaled. Since the load of an OTA server depends on the time zone, some OTA servers in some time zones can be underutilized, whereas in other time zones the OTA servers are over utilized. The underutilized OTA servers can be added to a given OTA update. A distribution node is also a utility to communicate with a mobility client directly for an OTA update. Some examples include MSP message engines (see FIG. 3), cell towers, WLAN access points, gateways, USB servers, mobile devices (e.g., a smartphone) or vehicles (V2V updates).

MNO 101 communicates wirelessly with mobility clients 102 through wireless network access points 105 (e.g., cell towers, WLANs) or satellite communication links. MNO 101 is coupled to one or more storage devices 106 and MSP 103 is coupled to one or more storage devices 107. Storage device (s) 106 can be used to cache download files for OTA update campaigns and other information, as described in further detail below. Storage device(s) 107 can be used to store information received from mobility clients 102 and various entities (e.g., OEMs), as described in further detail in reference to FIG. 3.

In an embodiment, MNO 101 provides wireless communications infrastructure and services to end users (e.g., MSP 103), including but not limited to: radio spectrum allocation, wireless network infrastructure, backhaul, billing, customer care, provisioning computer systems and marketing and repair organizations.

Figure 3:
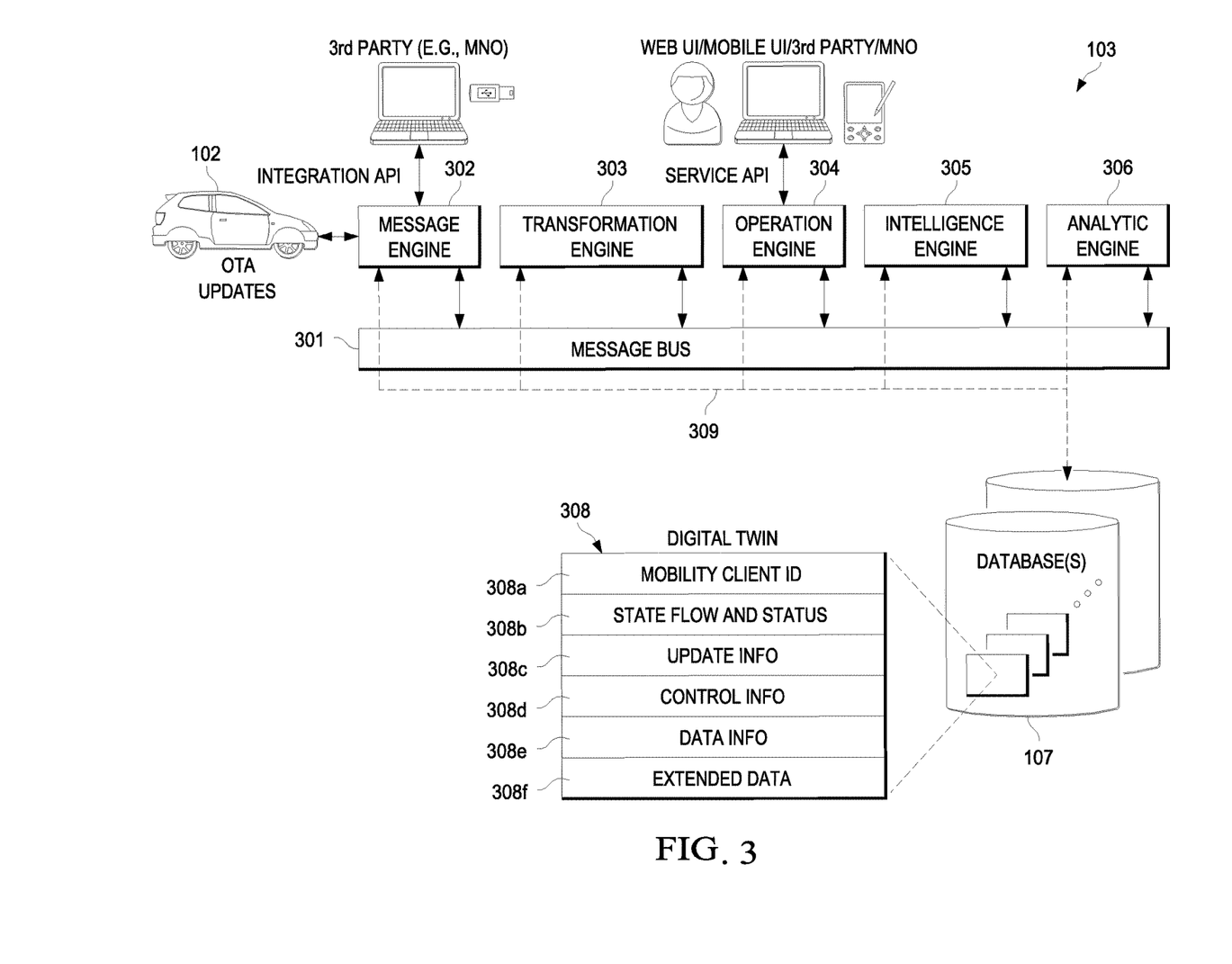
FIG. 3 is block diagram of a mobility services platform (MSP) for providing flexible, multidimensional infrastructure scaling, according to an embodiment.

In an embodiment, MSP 103 is a distributed computing platform that includes a data stream processing pipeline architecture for processing real-time data feeds from mobility clients 102, as described in reference to FIG. 3. MSP 103 includes a plurality of interconnected processors, routers, hubs, gateways, storage devices and other hardware that communicate data, commands and signals, over one or more buses. MSP 103 facilitates OTA update campaigns for OEMs and other entities and/or mobility services, such as application developers who desire to update various devices/components installed or embedded in mobility clients 102.

Based on a number of inputs, MSP 103 determines a cost-optimized approach for scaling cloud infrastructure, allocating communications resources and scheduling communications with mobility clients 102 or components/devices installed or embedded in mobility clients 102. Some examples of inputs include but are not limited to: the number and/or types of mobility clients to be updated, the update file size, the priority level for the update, the allowed update campaign duration, and various wireless communication parameters (e.g., geographic coverage, network capacity, link speed, resource availability, service availability) provided by, for example, MNO 101 or other entities. Using the inputs, MSP 103 automatically procures and allocates the required infrastructure and/or wireless communications resources for the OTA updates. For example, in an embodiment MSP 103 automatically leverages proxy capabilities of MNO 101, such as the capability of MNO 101 to cache OTA update files.

Example Flexible, Multidimensional Infrastructure Scaling

In an embodiment, MSP 103 supports the creation of OTA update campaigns that include five phases: file upload, approval, campaign task creation, distribution task creation and installation task creation. During campaign task creation, campaign requirements are entered by an operator through a dashboard GUI of MSP 103 and/or are automatically obtained through a data feed (e.g., XML data feed). The campaign requirements include but are not limited to: an identification of the number and/or type of mobility clients to be updated (or groups of mobility clients to be updated), the size of the update files, the priority for the update and the duration of the OTA update campaign (e.g., start and end dates of the campaign).

In an embodiment, MSP 103 is coupled to the core network of MNO 101 (and other MNOs) and receives infrastructure scaling data through one or more Application Programming Interfaces (APIs), as described in reference to FIG. 3. The APIs provide inputs to one or more servers of MSP 103 that are configured for implementing vertical and horizontal infrastructure scaling. Some examples of infrastructure scaling data include but are not limited to: network capacity, network bandwidth, costs, link speed, service availability, resources for large scale OTA updates, etc. In an embodiment, the service availability (e.g., 3G, 4G-LTE) in a specific geographic area can be used to determine infrastructure scaling data. For example, if a geographic area has 4G-LTE coverage, then an LTE category can be used to define link speed, cell capacity and link characteristics (e.g., signal strength, allocated per user network resources), which can be used by MSP 103 as infrastructure scaling data.

In an embodiment, an IoT connectivity platform (e.g., Jasper® of Santa Clara, Calif.) can aggregate APIs from multiple MNOs in operating environment 100 into a common or normalized API that can be leveraged by end users (e.g., leveraged by MSP 103) for obtaining infrastructure scaling data. For example, the IoT connectivity platform can provide an API adaptation layer that allows MSP 103 to access and utilize infrastructure scaling data from multiple MNOs in operating environment 100.

MSP 103 uses the infrastructure scaling data obtained from one or more MNOs and mobility clients 102 (e.g., bandwidth, link speed) to determine a number of infrastructure scaling options for an OTA update campaign. This includes a permutation method of selecting different combinations of numbers and/or types of infrastructure components and/or communication resources, determining a cost associated with each option, and selecting as a cost-optimal infrastructure scaling option the infrastructure scaling option that has the lowest associated cost. MSP 103 then procures and allocates IT infrastructure components and/or wireless communication resources according to the cost-optimal infrastructure scaling option for use in the OTA update campaign. MSP 103 then schedules communication sessions with mobility clients 102, assigns update channels and initiates the OTA updates using the procured and allocated IT infrastructure components and/or wireless communication resources.

In an embodiment, the costs for various communication options are compared for supporting the OTA update campaign, including options for scheduling downloads, distributing downloads evenly (load balancing) and scheduling downloads at preferred time periods (e.g., at night). Each of these communications options can be evaluated based on its respective communications characteristics (e.g., bandwidth, throughput, error rate) and associated costs.

Vertical Infrastructure Scaling Options

In an embodiment, MSP 103 determines a number of related concurrent downloads (e.g., at an OTA update service point) for each communication option, and then generates a number of vertical infrastructure scaling options (e.g., low-end, mid-range, high-end infrastructure components) that satisfy concurrent download requirements. If different MNOs have infrastructures that include different network components with different capacities (e.g., different processing resources, throughputs, interconnect link speeds), then a Software Defined Network (SDN) communications approach can be used. SDN controllers are commonly deployed in cellular networks and their inputs/outputs can be used for OTA campaign planning. The vertical infrastructure scaling costs are dependent on the number and/or type of IT infrastructure components and/or wireless communication resources used in the option. For example, costs will be impacted by the number of low-end, mid-range or high-end infrastructure components included in the vertical infrastructure scaling option.

Horizontal Infrastructure Scaling Options

In addition to vertical infrastructure scaling options and cost, MSP 103 also generates horizontal infrastructure scaling options. For example, MSP 103 determines the number and/or type of distribution nodes needed to satisfy concurrent download requirements for an OTA update campaign. The horizontal scaling cost depends on the specific MNOs used and their geographic locations. An example cost consideration is avoiding roaming charges. Costs can also depend on a geographic zone and/or time of the day based on the assumption that the network capacity at certain times of the day is less utilized, and therefore faster and less expensive OTA updates can be performed.

Another example of horizontal scaling cost consideration is whether there is overutilization of network capacity in certain geographic areas due to large public events, such as a sporting event in a large stadium. In such scenarios, the high concentration of thousands of cellphone users and mobility clients 102 in the same geographic will make it difficult to perform cost-effective OTA updates to mobility clients 102 in the geographic area.

Procurement and Allocation of Infrastructure/Communication Resources

In an embodiment, MSP 103 automatically procures and/or allocates required infrastructure and/or communications resources for a given OTA update campaign duration according to the cost-optimal infrastructure scaling option selected. In an embodiment, one or more load models can be used that utilize statistical analysis of mobility clients crossing major infrastructural facilities, such as bridges to determine the required infrastructure and/or communications resources to be procured or allocated.

Ideally, OTA updates are downloaded to vehicles from home networks or other WLANs when the vehicles are parked in private or public parking garages or parking lots. If WLAN deployment is unavailable or impractical, then OTA updates are ideally performed at major infrastructural facilities, due to the necessity to reset vehicle components after the OTA update. Also, when a vehicle moves over cellular networks it maybe more challenging to download updates due to interference, noise, and handovers between cells. When traffic is analyzed over a bridge throughout the day it represents a percentage of vehicles moving (to a total number of crossing the bridge in a 24 hour period). This most advantageous times of day or "windows" can be discovered for the OTA update. This helps in distributing OTA updates in certain geographical regions and time zones. A load model based on bridge traffic collected over a 24 hour period can be extended to multiple time zones in a geographic region (e.g., the United States). The load model can consider the effective bit rate of a particular access technology, download size, number of mobility clients, and a maximum allowed number of concurrent updates.

In an embodiment, the output of the model is the maximum number of concurrent updates that must be supported by the cost-optimal infrastructure scaling, which is then translated into an amount of cloud resources required to sustain the OTA campaign. For example, the maximum number of concurrent updates can be used to determine a number and type of Amazon® Elastic Compute Cloud (Amazon EC2) instances (or similar on-demand cloud computing platform) that are needed for the OTA updates. The number and type of cloud resources (e.g., the number of EC2 instances) are then translated into the cost of the infrastructure and/or communication resources needed for delivering the OTA updates to mobility clients 102.

Communication with Mobility Clients

After the procurement and allocation of infrastructure components and/or communication resources is completed for a given OTA update campaign, MSP 103 communicates with mobility clients 102 targeted by the OTA update campaign to schedule updates and to assign update channels. MSP 103 then executes the OTA update campaign using the procured and allocated IT infrastructure components and/or communication resources. The communication options used will also impact the total cost and will be considered, such as how the downloads will be scheduled (e.g., time of day) and the update channels assigned.

Example Process

Figure 2:
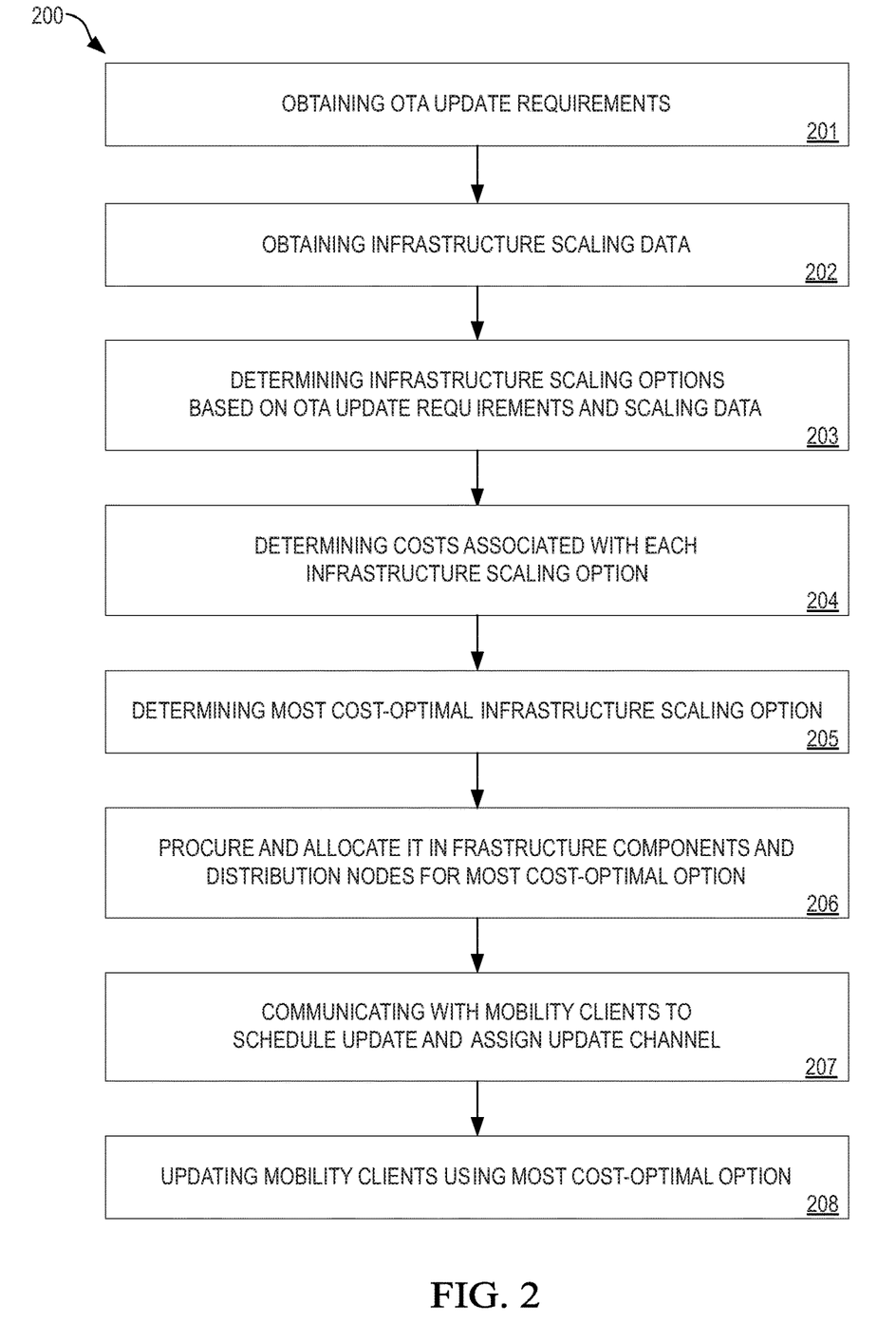
FIG. 2 is a flow diagram of a process for flexible, multi-dimensional infrastructure scaling, according to an embodiment.

FIG. 2 is a flow diagram of process 200 for flexible, multi-dimensional infrastructure scaling, according to an embodiment. Process 200 can be implemented using MSP 300, as described in reference to FIG. 3.

Process 200 begins by obtaining OTA update requirements from an MSP operator or from another source (201). The OTA update requirements can include but are not limited to: the number and types of mobility clients to receive updates, the duration of the update campaign, the size of the update files and the priority level for the updates. In an embodiment, the requirements can be obtained through a GUI (e.g., a dashboard GUI) and/or data feed (e.g., XML data feed) provided by the MSP or through any other suitable interface. The OTA update requirements can be provided by OEMs or any other entity.

Process 200 continues by obtaining infrastructure scaling data from one or more MNOs (202). For example, the MNOs and/or the MSP can provide one or more APIs for sending/receiving the infrastructure scaling data, including but not limited to: network capacity and current utilization, service availability, geographic coverage, cost schedules, proxy service capabilities (e.g., caching capabilities), link speed, cell capacity and link characteristics, such as signal strength and allocated per user network resources.

Process 200 continues by determining a number of infrastructure scaling options based on the OTA update requirements and the infrastructure scaling data (203). For example, using a permutation method different combinations of IT infrastructure components and/or communication resources can be generated for each option. Vertical and horizontal infrastructure scaling can be considered for one or more of the options.

For vertical infrastructure scaling, the MSP determines a number of related concurrent downloads at an OTA update service point for each communication option, and then determines a number and/or type of infrastructure components for the option (e.g., low-end, mid-range, high-end infrastructure components) that satisfy concurrent download requirements for the OTA updates. In an embodiment, vertical scaling includes adding more OTA servers and/or scaling engines within a single OTA server by adding more engine instances (e.g., more EC2 instances), the latter making an OTA server more "powerful" for OTA updates.

For horizontal infrastructure scaling, the MSP determines the number and/or type of distribution nodes needed to satisfy concurrent download requirements for the OTA updates. For example, each EC2 instance type (e.g., M2.large, M2.xlarge, etc.) has a cost per hour charged by AWS. Each EC2 instance type can support a number of concurrent OTA update sessions. The length of a given session depends on the EC2 type (e.g., more powerful CPU), cellular network capacity and available throughput. If the MSP runs more sessions concurrently then more EC2 instances are needed concurrently. Hence, the cost will increase at a given time. Therefore, the MSP can optimize cost by running updates at more advantageous times when networks are "faster" due to decreased capacity and by better utilizing instances. The cost of EC2 instances does not depend on the load. For example, if 10 sessions are run it will be the same cost as running 500 sessions per instance. In an embodiment, a model is used to estimate EC2 instance capacity (maximum number of OTA sessions) given certain cellular network types. Another type of cost that is considered is roaming charges.

In another example of vertical scaling is when a message engine capability of the MSP is increased to handle concurrent communications sessions with vehicles. The ability of the MSP to handle the increase in message engine capability may be limited by underlying computing performance and memory of (virtual) server hardware in the MSP and/or procured by the MSP from a datacenter (e.g., AWS servers). In this case, a low-end server instance may support 10,000 concurrent update sessions, a high-end instance server may support 20,000 updates and so forth. Vertical scaling allows the adding of CPUs and/or memory by either running the software on a more powerful server or by assigning more CPU cores and memory to a virtual server.

Process 200 continues by determining costs associated with each infrastructure scaling option (204), and then determining a cost-optimal infrastructure scaling option as the option with the lowest associated cost (205). For example, the costs can depend on a specific MNO used in the geographic area where the mobility clients will be updated, and whether there are roaming or other charges associated with the MNO. Also, the network capacity or link speed for the MNO during an event (e.g., a large venue sporting event) that will occur during the OTA update campaign will likely impact the cost of the infrastructure scaling option because of the expected high volume of traffic (e.g., high cell phone usage) and thus overutilization of the MNO core network infrastructure.

Process 200 continues by procuring and allocating infrastructure and/or wireless communications resources for the cost-optimal infrastructure scaling option (206). For example, suitable infrastructure hardware and software components and systems can be procured and/or allocated to handle the OTA updates according to the OTA update requirements. In an embodiment, one or more load models can be used that utilize statistical analysis of mobility clients crossing major infrastructural facilities, such as bridges. The load model can consider the effective bit rate of a particular access technology, download size, number of mobility clients, and a maximum allowed number of concurrent updates. The output of the load model is the maximum number of concurrent updates, which can be translated into the cloud resources required to support the OTA updates. In an embodiment, a number and type of Amazon® Elastic Compute Cloud (Amazon EC2) instances are determined for different software engines (or a similar on-demand cloud-computing platform) to support the OTA updates. The number and type of cloud resources required for the OTA update are translated into the cost of the cloud-based infrastructure for the OTA updates. In another embodiment, clouds resources can be scaled based on the time period of the update and the urgency of the update.

Process 200 continues by communicating with mobility clients to schedule updates and assign update channels (207), and updating the mobility clients using the procured and allocated infrastructure components and/or communication resources for the cost-optimal infrastructure scaling option. The updates can be stored in MNO cache, or other storage service, such as storage provided by a third party service, such as online storage provided by Amazon® Web Services (AWS).

Example Mobility Services Platform (MSP)

FIG. 3 is block diagram of a mobility services platform (MSP) 103 for providing flexible, multidimensional infrastructure scaling, according to an embodiment.

In some exemplary embodiments, MSP 103 includes message bus 301, message engine 302 and database(s) 107. In some exemplary embodiments, MSP 103 optionally includes transformation engine 303. In some exemplary embodiments, MSP 103 optionally includes operation engine 304. In some exemplary embodiments, MSP 103 optionally includes intelligence engine 305. In some exemplary embodiments, MSP 103 optionally includes analytic engine 306. In an embodiment, one or more of engines 302-306 are each an instance of a software method that runs on one or more servers of MSP 103. These software instances are configured to communicate with each other using message bus 301. Multiple instances of engines 302-306 can run concurrently. Engines 302-306 provide OTA services (e.g., software updates, client connectivity, remote control and operation monitoring), and data services (e.g., data ingestion, data storage/management, data analytics, real-time processing and data retrieving control).

In an embodiment, a load balancer (not shown) running on one or more servers manages connection requests from mobility clients 102 by listening on one or more ports connected to mobility clients 102 to access OTA services. The load balancer forwards requests to a backend server that has at least one instance of message engine 302 running. In an embodiment, the load balancer maintains persistence (server affinity) to ensure that connections and subsequent requests from mobility clients 102 are sent to the same server after a service interruption (e.g., due to a lost connection). Messages sent by mobility clients 102 can be formatted in any known data-interchange format, such as Extensible Markup Language (XML) or Java® Script Object Notation (JSON).

In an embodiment, message bus 301 is implemented by a distributed streaming platform. The distributed streaming platform publishes and subscribes to streams of messages (also referred to as "records"), stores the streams of messages in database(s) 307 and provides a real-time streaming data pipeline that can transfer the streams of messages between engines 302-306. An example message bus 301 is the Apache Kafka® distributed streaming platform. In an embodiment, consumers of messages can subscribe to a particular "topic" to retrieve messages from message bus 301 for that topic. A topic is a category or feed name to which messages are published. The topics are multi-subscriber and can have zero, one, or many consumers that subscribe to the data written to the topic. Raw input data is consumed from topics and then aggregated, enriched, or otherwise transformed into new topics for further consumption or follow-up processing by other consumers of MSP 103.

In an embodiment, data structure 308 is created for mobility client devices 102 and stored in one or more databases 307. Each instance of each engine 302-306 can create a copy of data structure 308 for a particular mobility client, and read or write data to any field 308b-308f in data structure 308. A copy of data structure 308 for every mobility client 102 can be stored on a plurality of distributed databases. A background process implemented by MSP 103 can maintain coherency between different copies of data structure 308 stored on distributed databases.

In an embodiment, data structure 308 includes a number of fields for exchanging data between mobility clients 102 and MSP 103. In the example shown, the fields include but are not limited to: Mobility Client ID field 308a, State Flow/Status field 308b, Update Info field 308c, Control Info field 308d, Data Info field 308e and Extended Data field(s) 308f. These fields are exemplary and other embodiments of data structure 308 can have more or fewer fields.

Mobility Client ID 308a can be a Universally Unique Identifier (UUID) that uniquely identifies a mobility client. In an embodiment, Mobility Client ID 308a stores a Vehicle Identification Number (VIN) that can be used to uniquely identify a mobility client. State Flow/Status field 308b includes state and session-specific information for persistence (server affinity). Update Info field 308c includes information associated with a particular software update, such as a download information file provided by intelligence engine 305. Control Info field 308d includes commands for remote control of an OTA client, such as a disable command to disable a particular software version installed on the mobility client. For inbound messages, Data Info field 308e includes the name of the mobility client, a timestamp and a link to a software package for the mobility client that is stored in in a software package repository. For outbound messages, the Data Info field 308e is used to send data and commands to the mobility client.

Extended Data field(s) 308f are used to send and receive data or services. Extending Data fields 308f can include links to data or service providers (e.g., URIs, URLs, pointer) or an application programming interface (API). For example, if a mobility client requests a service or data that is hosted by a third party data or service provider external to MSP 103, then Extended Data field(s) 308f can provide an interface to the data or service and MSP 103 will handle the necessary connections to the third party server computers to request and receive results generated by the third party server computers. In this manner, each mobility client will have data structure 308 with a number of customized Extended data filed(s) 308f based on the particular services or applications subscribed to by the mobility client. For example, if the mobility client wants to subscribe to a traffic or weather service, access to the traffic or weather service is provided through the Extended Data field(s) 308f of data structure 308 for that mobility client. The services can be hosted on third party server computers (e.g., hosted by server farm) or by MSP server computers. The services that can be subscribed to include any service that is available through any mobile application accessible by, for example, a smartphone.

This feature described above is advantageous because it allows integration of mobile applications that the user is already subscribed to on their smartphone or tablet computer to be available in their vehicle through, for example, an entertainment system or vehicle computer.

In an embodiment, third party software can be hosted on servers of MSP 103 and Extended Data field(s) 308f provide access to the services through an API or other interface mechanism. In an embodiment, user profile data can be sent to MSP 103 in Extended Data field(s) 308f. Personal profile information can be any data related to the personal preferences of an operator of the mobility client, including but not limited to: climate control data, seat and mirror adjustment data, entertainment preference data (e.g., radio presets, music playlists), telephone contact lists, navigation data (e.g., history data, destination locations) and any other data that is personalized to a particular operator of the mobility client.

In an embodiment, Extended Data field(s) 308f can include multiple personal profiles. For example, each member of a family who shares the mobility client can have their own personal profile. Also, if the mobility client is part of a fleet of mobility clients (e.g., taxis, rental cars, company vehicles), then personal profiles for each operator can be stored in database(s) 107.

In another embodiment, extended data fields(s) 308f can be used for a Mobile Device Management (MDM) service. For example, MDM data downloaded onto the mobility client can allow or restrict employees from using certain features, including imposing and enforcing policies on the mobility client, such as policies to optimize mobility client usage and secure data. For example, MDM data can configure a mobility client to report mobility client data to MSP 103 where it can be further analyzed. Mobility client data can include but is not limited to: location data (e.g., timestamp, latitude, longitude, and altitude), sensor data (e.g., acceleration data, gyroscope data) and environment data (e.g., temperature data). In an embodiment, the location data can be used to determine if a mobility client has entered or exited a geofence (a virtual geographic boundary) to trigger a download of a software package or perform some other location-based service.

In an embodiment, geofence crossings can be used to determine if a corporate policy has been violated. For example, drivers for a taxi service may be prohibited from traveling within or outside a certain geographic region enclosed by a geofence. If the mobility client is a self-driving vehicle, then Extended Data fields(s) 308*f* can include mobility client data specific to self-driving vehicles, such as LiDAR, ultrasonic sensors, radar, Global Navigation Satellite System (GNSS), stereo camera and map data. In an embodiment, the mobile client data can be used by analytic engine 306 to detect and predict various maintenance problems with mobility clients 102.

After the load balancer (not shown) receives a message from a mobility client, the load balancer sends the message to a MSP server that is running an instance of message engine 302. Message engine 302 provides an end-point to communicate with one or more mobility clients 102 and supports both inbound and outbound message processing. The number of message engines 302 that are concurrently running is based on the number of active connections with mobility clients 102. In an embodiment, the load balancer and/or message engine 302 implements one or more protocols for communicating with mobility clients 102, including but not limited to: Transmission Control Protocol/Internet Protocol (TCP/IP), Hypertext Transfer Protocol (HTTP), Hypertext Transfer Protocol Secure (HTTPS), Message Queue Telemetry Transport (MQTT) protocol and Open Mobile Alliance Device Management (OMA-DM) protocol.

In an embodiment, message engine 302 reads the message header and performs version authentication. An integration Application Programming Interface (API) allows third party applications to communicate with message engine 302 over a network (e.g., the Internet). For example, the integration API receives infrastructure scaling data from MNOs or other entities and/or campaign requirements, as described in reference to FIGS. 1 and 2.

For example, the SOTA service may be unavailable, or the software update may be too large to transfer using the SOTA service. In such cases, the integration API may be used by an application running on a personal computer or mobile device to upload or deliver a software package to a personal computer over a network. After the package is downloaded to the personal computer it can be transferred to a Universal Serial Bus (USB) thumb drive. For example, a technician in a repair shop or dealership can download a software package from MSP 103 to a personal computer, transfer the package to a thumb drive, and then connect the thumb drive directly to a port of a vehicle computer to transfer the software package to the vehicle.

Transformation engine 303 reads the message body and transforms the message body into a common message data format used by message bus 301 (e.g., the Kafka® streaming format).

Operation engine 304 supports data operations, software operations and system issue management. In an embodiment, operation engine 304 provides vertical and horizontal scaling based on campaign requirements and infrastructure scaling data provided by MNOs and other entities, as described in reference to FIGS. 1 and 2.

In an embodiment, operation engine 304 provides a Web portal and mobile user interface (UIs) to communicate with system clients (e.g., OEMs, software developers). Operation engine 304 generates reports with visualizations (e.g., charts, tables), which can be viewed on the Web portal and/or mobile UIs, and sends notifications/alerts to system clients using various modes of communication (e.g., email, push notification, text message). Operation engine 304 also provides a service API that allows system clients to access mobility services using their proprietary applications. In an embodiment, the service API supports a payment system that manages billing-based software updates using data retrieved through the service API. In an embodiment, the service API receives infrastructure scaling data from MNOs or other entities and/or campaign requirements, as described in reference to FIGS. 1 and 2.

Intelligence engine 305 supports various OTA operations, including software packaging, software dependency checking, scheduling and monitoring.

Analytic engine 306 supports business intelligence, including report generation and alert detection. Analytic engine 306 also provides an Interactive Development Environment (IDE) that includes a dashboard and workflow canvass that allows a data analyst to build, test and deploy distributed workflows using real-time message streams or a database as a data source.

In an embodiment, database(s) 107 include(s) a relational database (e.g., SQL database) and a distributed NoSQL database (e.g., Apache Cassandra™ DBMS with Elasticsearch™ service) for storing messages, data logs, software packages, operation history and other data. The data stored can be either structured or unstructured. In an embodiment, engines 302-306 can communicate with database(s) 107 over data access layer (DAL) 309 using, for example, the Java® EE data access object (DAO).

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other units suitable for use in a computing environment.

While this document contains many specific implementation details, the implementation details should not be construed as limitations on the scope of what may be claimed but rather as a description of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

While logic flows or operations are depicted in the drawings in a particular order this should not be understood as requiring that such operations be performed in the particular order shown or in sequential order, or that all illustrated operations be performed, to achieve desirable results. In certain circumstances, multitasking and parallel processing may be advantageous. Moreover, the separation of various software components in the embodiments described above should not be understood as requiring such separation in all embodiments, and it should be understood that the described software components can generally be integrated together in a single software program or multiple software programs.

Some aspects of the subject matter of this specification may include gathering and use of data available from various sources. The present disclosure contemplates that in some instances, this gathered data may identify a particular location or an address based on device usage. Such personal information data can include location-based data, addresses, subscriber account identifiers, or other identifying information. The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure.

What is claimed is:

1. A method comprising:
   obtaining, by one or more server computers of a network-based, over-the-air (OTA) computing platform, one or more requirements for OTA updates, the one or more requirements for OTA updates including a number and types of mobility clients to receive the OTA updates;
   obtaining, by the one or more server computers, infrastructure scaling data indicative of at least one of information technology (IT) infrastructure resources or communications resources provided by at least one mobile network operator (MNO), the infrastructure scaling data including at least one of a network capacity of the at least one MNO, a current utilization of the at least one MNO, a service availability of the at least one MNO for the mobility clients, or a link speed associated with the at least one MNO;
   determining, by the one or more server computers and using the infrastructure scaling data, a plurality of infrastructure scaling options that satisfy the one or more requirements for the OTA updates, each of the plurality of the infrastructure scaling options including a different number or different types of infrastructure resources or communications resources to deliver the OTA updates to the number and the types of the mobility clients;
   determining, by the one or more server computers, a respective cost associated with each of the infrastructure scaling options, the respective cost being based on: a maximum allowed number of concurrent OTA updates, a required number of infrastructure resources or communication resources to support the maximum allowed number of concurrent OTA updates, and a cost associated with the required number of infrastructure resources or communication resources;
   determining, by the one or more server computers, a cost-optimal infrastructure scaling option from the plurality of infrastructure scaling options that has a lowest respective cost;
   allocating, by the one or more server computers, the number and the type of infrastructure resources or communication resources according to the cost-optimal infrastructure scaling option;
   communicating, by the one or more server computers to the mobility clients, an update time and update channel for delivering the OTA updates to the mobility clients; and
   initiating, by the one or more server computers, delivery of the OTA updates to the mobility clients using the allocated number and type of infrastructure resources or communication resources.

2. The method of claim 1, further comprising:
   allocating a number of distribution nodes according to the cost-optimal infrastructure scaling option; and
   initiating, by the one or more server computers, delivery of the OTA updates to the mobility clients using the allocated number and type of infrastructure resources or communication resources and the allocated number of distribution nodes.

3. The method of claim 1, wherein the infrastructure scaling data includes data indicative of proxy capabilities of the at least one MNO to store the OTA updates.

4. The method of claim 3, wherein the proxy capabilities include caching capabilities for caching OTA update files by the at least one MNO.

5. The method of claim 1, wherein the infrastructure scaling data is provided at least in part by a Software Defined Network (SDN) controller.

6. The method of claim 1, wherein determining the respective cost associated with each of the infrastructure scaling options further comprises:
   determining a required number of distribution nodes to support the maximum allowed number of concurrent OTA updates; and
   determining the respective cost for the infrastructure scaling option based on the required number of distribution nodes.

7. The method of claim 1, wherein determining the respective cost associated with each of the infrastructure scaling options further comprises determining a location of the at least one MNO and whether the respective cost includes roaming charges due to the location.

8. The method of claim 1, wherein determining the respective cost associated with each of the infrastructure scaling options further comprises determining the respective cost based on a time of day when the OTA updates will be delivered.

9. The method of claim 1, wherein determining the respective cost associated with each of the infrastructure scaling options further comprises determining if there is overutilization of network capacity due to a high concentration of mobility clients.

10. The method of claim 1, wherein allocating the number and the type of infrastructure resources or communication resources according to the cost-optimal infrastructure scaling option comprises:
    using statistical models to allocate infrastructure resources or communication resources based on at least one of an effective bit rate of an access technology, a size of an OTA update file, the number and the types of the mobility clients to receive the OTA update, or the maximum allowed number of concurrent OTA updates.

11. A system comprising:
    one or more server computers of a network-based over-the-air (OTA) computing platform, the one or more server computers configured to:
    obtain one or more requirements for OTA updates, the one or more requirements for OTA updates including a number and types of mobility clients to receive the OTA updates;

obtain infrastructure scaling data indicative of at least one of information technology (IT) infrastructure resources or communications resources provided by at least one mobile network operator (MNO), the infrastructure scaling data including at least one of a network capacity of the at least one MNO, a current utilization of the at least one MNO, a service availability of the at least one MNO for the mobility clients, or a link speed associated with the at least one MNO;

determine, based on the infrastructure scaling data, a plurality of infrastructure scaling options that satisfy the one or more requirements for the OTA updates, each of the plurality of the infrastructure scaling options including a different number or different types of infrastructure resources or communications resources to deliver the OTA updates to the number and the types of the mobility clients;

determine a respective cost associated with each of the infrastructure scaling options, the respective cost being based on a maximum allowed number of concurrent OTA updates, a required number of infrastructure resources or communication resources to support the maximum allowed number of concurrent OTA updates, and a cost associated with the required number of infrastructure resources or communication resources;

determine a cost-optimal infrastructure scaling option from the plurality of infrastructure scaling options that has a lowest respective cost;

allocate the number and the type of infrastructure resources or communication resources according to the cost-optimal infrastructure scaling option;

communicate to the mobility clients, an update time and update channel for delivering the OTA updates to the mobility clients; and initiate delivery of the OTA updates to the mobility clients using the allocated number and type of infrastructure resources or communication resources.

12. The system of claim 11, wherein the one or more server computers are further configured to:
allocate a number of distribution nodes according to the cost-optimal infrastructure scaling option; and
initiate delivery of the OTA updates to the mobility clients using the allocated number and type of infrastructure resources or communication resources and the allocated number of distribution nodes.

13. The system of claim 11, wherein the infrastructure scaling data includes data indicative of proxy capabilities of the at least one MNO to store the OTA updates.

14. The system of claim 13, wherein the proxy capabilities include caching capabilities for caching OTA update files by the at least one MNO.

15. The system of claim 11, wherein the infrastructure scaling data is provided at least in part by a Software Defined Network (SDN) controller.

16. The system of claim 11, wherein a determination of the respective cost associated with each of the infrastructure scaling options, further comprises:
determine a required number of distribution nodes to support the maximum allowed number of concurrent OTA updates; and
determine the respective cost for the infrastructure scaling option based on the required number of distribution nodes.

17. The system of claim 11, wherein a determination of the respective cost associated with each of the infrastructure scaling options further comprises determine a location of the at least one MNO and whether the respective cost includes roaming charges due to the location.

18. The system of claim 11, wherein a determination of the respective cost associated with each of the infrastructure scaling options further comprises determine the respective cost based on a time of day when the OTA updates will be delivered.

19. The system of claim 11, wherein a determination of the respective cost associated with each of the infrastructure scaling options further comprises determine if there is overutilization of network capacity due to a high concentration of mobility clients.

20. The system of claim 11, wherein allocation of the number and the type of infrastructure resources or communication resources according to the cost-optimal infrastructure scaling option further comprises:
use statistical models to allocate infrastructure resources or communication resources based on at least one of an effective bit rate of an access technology, a size of an OTA update file, the number and the types of the mobility clients to receive the OTA update, or the maximum allowed number of concurrent OTA updates.

* * * * *